United States Patent
Suzuki et al.

(10) Patent No.: US 9,716,797 B2
(45) Date of Patent: Jul. 25, 2017

(54) MOBILE WIRELESS COMMUNICATION CONTROL DEVICE AND MOBILE WIRELESS COMMUNICATION SYSTEM

(71) Applicants: Shigeaki Suzuki, Chiyoda-ku (JP); Wataru Fushimi, Chiyoda-ku (JP); Tadashi Yamaura, Chiyoda-ku (JP)

(72) Inventors: Shigeaki Suzuki, Chiyoda-ku (JP); Wataru Fushimi, Chiyoda-ku (JP); Tadashi Yamaura, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 36 days.

(21) Appl. No.: 14/760,074

(22) PCT Filed: Mar. 11, 2013

(86) PCT No.: PCT/JP2013/056644
§ 371 (c)(1),
(2) Date: Jul. 9, 2015

(87) PCT Pub. No.: WO2014/141364
PCT Pub. Date: Sep. 18, 2014

(65) Prior Publication Data
US 2015/0350454 A1    Dec. 3, 2015

(51) Int. Cl.
*H04W 4/00*    (2009.01)
*H04M 15/00*    (2006.01)
(Continued)

(52) U.S. Cl.
CPC ....... *H04M 15/56* (2013.01); *H04W 28/0231* (2013.01); *H04W 48/06* (2013.01);
(Continued)

(58) Field of Classification Search
CPC . H04M 15/56; H04W 28/0231; H04W 48/06; H04W 84/005; H04W 28/0226; H04W 48/04
See application file for complete search history.

(56) References Cited

U.S. PATENT DOCUMENTS 5,937,350 A    8/1999    Frank
6,356,760 B1    3/2002    Suzuki
(Continued)

FOREIGN PATENT DOCUMENTS

EP    0 859 476 A2    8/1998
JP    11-4476 A    1/1999
(Continued)

OTHER PUBLICATIONS

International Search Report issued Apr. 23, 2013 in PCT/JP2013/056644 filed Mar. 11, 2014.
(Continued)

*Primary Examiner* — Robert Wilson
(74) *Attorney, Agent, or Firm* — Oblon, McClelland, Maier & Neustadt, L.L.P.

(57) ABSTRACT

A mobile wireless communication control device includes a moving object information holder that stores a communication state of each moving object which moves in a plurality of wireless zones and information showing a wireless zone to which the moving object belongs, and a call admission determinator that refers to the information held by the moving object information holder, and determines whether a moving object which is going to start communications can start the communications on the basis of the number of calls of moving objects in communication in a first wireless zone to which the moving object which is going to start the
(Continued)

communications belongs, and the number of calls of moving objects in communication in a second wireless zone adjacent to the first wireless zone.

13 Claims, 6 Drawing Sheets

(51) Int. Cl.
*H04W 48/06* (2009.01)
*H04W 48/04* (2009.01)
*H04W 28/02* (2009.01)
*H04W 84/00* (2009.01)

(52) U.S. Cl.
CPC ........ *H04W 28/0226* (2013.01); *H04W 48/04* (2013.01); *H04W 84/005* (2013.01)

(56) References Cited

U.S. PATENT DOCUMENTS

| | | | |
|---|---|---|---|
| 6,721,568 B1* | 4/2004 | Gustavsson | H04W 28/18 370/331 |
| 7,852,808 B2 | 12/2010 | Wang | |
| 2002/0107021 A1 | 8/2002 | Ishikawa et al. | |
| 2003/0050064 A1 | 3/2003 | Davies et al. | |
| 2006/0105777 A1* | 5/2006 | Shinozaki | H04W 60/04 455/456.1 |
| 2008/0076442 A1* | 3/2008 | Ishii | H04W 28/18 455/453 |
| 2008/0146240 A1 | 6/2008 | Trudeau | |
| 2008/0260168 A1* | 10/2008 | Chen | H04M 1/6008 381/57 |
| 2010/0014652 A1 | 1/2010 | Yasuda | |
| 2010/0020764 A1* | 1/2010 | Yamamoto | H04W 36/245 370/331 |
| 2011/0069683 A1* | 3/2011 | Kohyama | H04L 5/0007 370/336 |
| 2013/0109412 A1* | 5/2013 | Nguyen | G06Q 30/0207 455/456.3 |
| 2015/0350454 A1* | 12/2015 | Suzuki | H04M 15/56 370/329 |

FOREIGN PATENT DOCUMENTS

| | | |
|---|---|---|
| JP | 2005-260487 A | 9/2005 |
| JP | 2008-263464 A | 10/2008 |
| WO | WO 97/13334 A1 | 4/1997 |

OTHER PUBLICATIONS

Extended European Search Report issued on Oct. 11, 2016 in European Patent Application No. 13878497.0.
Office Action issued May 19, 2017 in European Patent Application No. 13 878 497.0.

* cited by examiner

| Train Number | Call State | Base Station Number | Traveling Direction | Call Start Time |
|---|---|---|---|---|
| 21 | 1 | 11 | 1 | 15:02:11 |
| 22 | 0 | 12 | 1 | — |
| 23 | 0 | 16 | 0 | — |
| ⋮ | ⋮ | ⋮ | ⋮ | ⋮ |
| 2M | 1 | 1N | 0 | 15:00:20 |

FIG.3

| | Base Station Zone 31 | Base Station Zone 32 | Base Station Zone 33 |
|---|---|---|---|
| Traveling Direction 1 (Direction of 11→1N) | a | c | e |
| Traveling Direction 2 (Direction of 1N→11) | b | d | f |

FIG.4

| | Base Station Zone 31 | Base Station Zone 32 | Base Station Zone 33 | Base Station Zone 34 |
|---|---|---|---|---|
| Traveling Direction 1 (Direction of 11→1N) | a | c | e | g |
| Traveling Direction 2 (Direction of 1N→11) | b | d | f | h |

FIG.5

| Train Number | Call State | Base Station Number | Traveling Direction | Call Start Time | Base Station Zone Entry Time |
|---|---|---|---|---|---|
| 21 | 1 | 11 | 1 | 15:02:11 | 14:58:24 |
| 22 | 0 | 12 | 1 | — | 15:02:11 |
| 23 | 0 | 16 | 0 | — | 14:55:33 |
| ⋮ | ⋮ | ⋮ | ⋮ | ⋮ | ⋮ |
| 2M | 1 | 1N | 0 | 15:00:20 | 14:59:52 |

FIG.6

| | | Base Station Zone 31 | Base Station Zone 32 | Base Station Zone 33 | Base Station Zone 34 |
|---|---|---|---|---|---|
| Traveling Direction 1 (Direction of 11→1N) | During Call at Expected Value t≤α×t22 | a1 | c1 | e1 | g1 |
| | During Call at Expected Value t≥β×t22 | a2 | c2 | e2 | g2 |
| | During Call Regardless of Expected Value t | a | c | e | g |
| Traveling Direction 2 (Direction of 1N→11) | During Call at Expected Value t≤α×t22 | b1 | d1 | f1 | h1 |
| | During Call at Expected Value t≥β×t22 | b2 | d2 | f2 | h2 |
| | During Call Regardless of Expected Value t | b | d | f | h |

FIG.7

| Train Number | Terminal Number | Call State | Base Station Number | Traveling Direction | Call Start Time | Base Station Zone Entry Time |
|---|---|---|---|---|---|---|
| 21 | 1 | 1 | 11 | 1 | 15:02:11 | 14:58:24 |
| 21 | 2 | 0 | 11 | 1 | — | 14:58:24 |
| 22 | 1 | 0 | 12 | 1 | — | 15:02:11 |
| 22 | 2 | 0 | 12 | 1 | — | 15:02:11 |
| 23 | 1 | 0 | 16 | 0 | — | 14:55:33 |
| 23 | 2 | 1 | 16 | 0 | 14:56:02 | 14:55:33 |
| ⋮ | ⋮ | ⋮ | ⋮ | ⋮ | ⋮ | ⋮ |
| 2M | 1 | 1 | 1N | 0 | 15:01:30 | 14:59:52 |
| 2M | 2 | 1 | 1N | 0 | 15:00:20 | 14:59:52 |

MOBILE WIRELESS COMMUNICATION CONTROL DEVICE AND MOBILE WIRELESS COMMUNICATION SYSTEM

FIELD OF THE INVENTION

The present invention relates to a mobile wireless communication control device that controls communications of a medium, such as a voice or an image, in a mobile wireless communication system, and the mobile wireless communication system.

BACKGROUND OF THE INVENTION

In a mobile wireless communication system, for example, in a call between a train which is a moving object, and the ground, switching between wireless zones (base station zones) each of which is managed by a wireless base station occurs during the call because the train moves at a high speed. In order to reduce sound interruptions which occur at the time of this switching, for example, patent reference 1 discloses a technique of, at the time of a call start, blocking, in advance, both a channel of a base station zone located in the traveling direction with respect to a base station zone to which the train currently belongs, and a channel of a base station zone located in a direction opposite to the traveling direction, and similarly passing a voice signal which is transmitted to the voice channel used in the current base station zone also to the next base station zone.

There are two reasons why a channel of the base station zone located in the traveling direction of the train is blocked in advance. One of them is that the voice signal is also passed to the next base station zone, as mentioned above. The other one is that because there is a limit to the number of channels usable in one base station zone, there may occur a problem that, when the train has moved to the next base station zone, there is no empty channel for the call, and therefore the channel is blocked to avoid this problem. Further, the reason why a channel of the base station zone located in a direction opposite to the traveling direction is blocked is that when there is a train which is moving to this base station zone from the opposite direction and is during a call, the number of channels required for calls needs to be prevented from becoming insufficient when the train has reached this base station zone.

On the other hand, a VoIP (Voice over IP) technique of IP-packetizing and transmitting a voice signal has become popular with the development of IP (Internet Protocol) networks in recent years. Introduction of VoIP is expected also in mobile wireless communications from this time forward. In VoIP, voice information is transmitted by using IP packets without being discriminated from data information. Therefore, there is provided an advantage of being able to implement integration of data communications and voice communications at a low cost.

RELATED ART DOCUMENT

Patent Reference

Patent reference 1: Japanese Unexamined Patent Application Publication No. 2008-263464

SUMMARY OF THE INVENTION

Problems to be Solved by the Invention

It is not necessary to allocate any dedicated channel to a voice call in VoIP. However, it is therefore difficult to introduce a control operation of blocking a channel in advance, such as a control operation performed in a conventional mobile wireless communication system, into VoIP. Although a control operation of allocating a dedicated band to each call of voice can be performed in VoIP, as a matter of course, the configuration becomes complicated if the same control as that for circuit switching is introduced, and the above-mentioned merit of the VoIP introduction is lost.

However, because wireless resources are limited, there is a limit to the number of trains in each of which a call can be made in one base station zone, transmission packets are lost when the number of trains exceeds the limit, and the speech quality degrades because voice information is missing according to this loss. A problem is that in a case in which VoIP is introduced into a mobile wireless communication system, analogous use of a conventional technology of blocking a channel for call in advance loses the merit of the VoIP introduction, as mentioned above, while the speech quality degrades unless a channel for call is blocked.

The present invention is made in order to solve the above-mentioned problems, and it is therefore an object of the present invention to implement communications, such as a high-quality voice call, in a mobile wireless communication system using VoIP.

Means for Solving the Problem

In accordance with the present invention, there is provided a mobile wireless communication control device that, in a mobile wireless communication system in which a moving object which moves in a plurality of wireless zones performs communications with a ground side via a base station, performs start control of the above-mentioned communications, the mobile wireless communication control device including: a moving object information holder to store a communication state of each moving object and information showing a wireless zone to which the moving object belongs; and a call admission determinator to refer to the information held by the above-mentioned moving object information holder, and determine whether a moving object which is going to start the above-mentioned communications can start the communications on the basis of the number of calls of moving objects in communication in a first wireless zone to which the above-mentioned moving object which is going to start the communications belongs, and the number of calls of moving objects in communication in a second wireless zone adjacent to the first wireless zone.

Advantages of the Invention

In accordance with the present invention, high-quality communications, such as a high-quality voice call, can be implemented in the VoIP-ized mobile wireless communication system.

EMBODIMENTS OF THE INVENTION

Hereafter, the preferred embodiments of the present invention will be explained in detail with reference to the drawings.

In the following embodiments, a case in which a train which makes a wireless voice call is provided as a moving object which includes a wireless device and performs communications will be explained as an example.

Embodiment 1.

Figure 1:
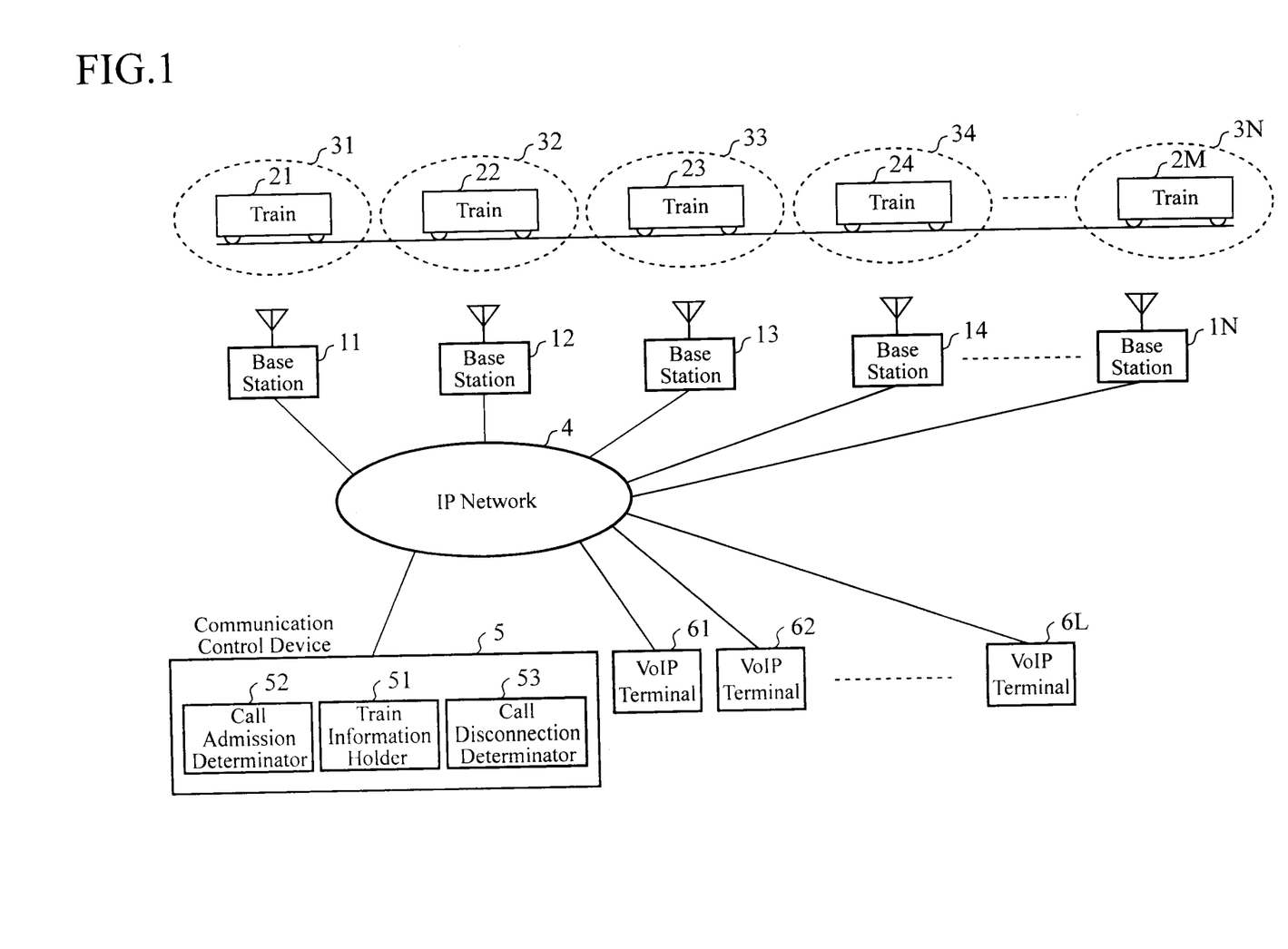
FIG. 1 is a structural diagram of a train wireless voice communication system in accordance with Embodiment 1 of the present invention.

FIG. 1 is a structural diagram of a train wireless voice communication system in accordance with Embodiment 1 of the present invention.

In FIG. 1, trains (moving objects) 21 to 2M operate in the system, and base stations 11 to 1N manage base station zones 31 to 3N. The base station zones 31 to 3N are wireless zones.

A communication control device 5 performs control of start and end of calls (communications) between VoIP terminals 61 to 6L on a ground side, and the trains 21 to 2M via an IP network 4. The IP network 4 transfers IP packets on the ground.

The communication control device 5 includes a train information holder 51, a call admission determinator 52, and a call disconnection determinator 53.

The train information holder 51 holds a call (communication) state and an operation state of each of the trains. The call admission determinator 52 determines whether or not a call start can be made. The call disconnection determinator 53 determines whether or not to disconnect a call currently being made.

Next, a call control operation of the train wireless voice communication system will be explained.

In this embodiment, a summarized call control operation which is performed after the train 22 located in the base station zone 32 transmits a call to the VoIP terminal 61 and a call starts until the call is completed will be explained as an example.

The SIP (Session Initiation Protocol) is used for the call control. First, the train 22 transmits an INVITE request, which is a call start request to the VoIP terminal 61, to the communication control device 5. When the communication control device 5 receives the INVITE request from the train 22, the call admission determinator 52 in the communication control device 5 determines whether the train can make the call on the basis of the information held by the train information holder 51. The operations of the train information holder 51 and the call admission determinator 52 including this determining operation will be described below.

When the call admission determinator 52 determines that the train can make the call, the communication control device 5 transfers the INVITE request to the VoIP terminal 61. When receiving the INVITE request, the VoIP terminal 61 calls the user of the VoIP terminal 61 by using a ringer or the like. When the user of the VoIP terminal 61 responds to the call, the VoIP terminal 61 transmits a 200 O.K. response which is a response message to the received INVITE request to the call control device 5.

The call control device 5 transfers this 200 O.K. response to the train 22. When receiving the 200 O.K. response, the train 22 determines that the train can make the call, and transmits an ACK request showing that the train has received the 200 O.K. response to the call control device 5. The call control device 5 transfers the ACK request to the VoIP terminal 61 and the VoIP terminal 61 receives the ACK request, and, as a result, the call control of the call start according to the SIP is completed, and, after that, the call is made by transmitting and receiving voice packets between the train 22 and the VoIP terminal.

When the call is completed, a BYE request to make a request for end of the call from the train 22 is transmitted to the communication control device 5, and the communication control device 5 transfers this request to the VoIP terminal 61. The VoIP terminal 61 transmits a 200 O.K. response, which is a response message to the BYE request, to the communication control device 5, and the communication control device 5 transfers this 200 O.K. response to the train 22. Through the reception of this response by the train 22, this call is ended, and the train 22 and the VoIP terminal stop the transmission and reception of voice packets.

Further, if the call admission determinator 52 determines that the call cannot be made when the communication control device 5 receives the INVITE request from the train 22, the communication control device 5 transmits a 486 Busy response, which is a response message showing that a call start cannot be made, to the train 22. When receiving the 486 Busy response, the train 22 transmits an ACK request, which is a message showing that the train has received this response, to the communication control device 5, and also recognizes that the call cannot be made. At that time, the call is not established and the call control is completed.

Although the above explanation is the one of typical call start control in general VoIP according to the SIP, the call admission determinator 52 in the communication control device 5 needs to perform an operation of determining whether or not the call can be made, as mentioned above, and this operation is a one specific to the train wireless voice communication system. Hereafter, the operation of the communication control device 5 will be explained.

First, the operation of the train information holder 51 of the communication control device 5 will be explained.

The train information holder 51 holds, for each of the trains 21 to 2M in this train wireless voice communication system, a train number specifying the train, a call state showing whether or not each of the trains 21 to 2M is during a call, a number specifying one of the base stations 11 to 1N corresponding to one of the base station zones 31 to 3N to which each of the trains 21 to 2M currently belongs, the traveling direction of each of the trains 21 to 2M, and, when each of the trains 21 to 2M is during a call, the start time of the call.

Figure 2:
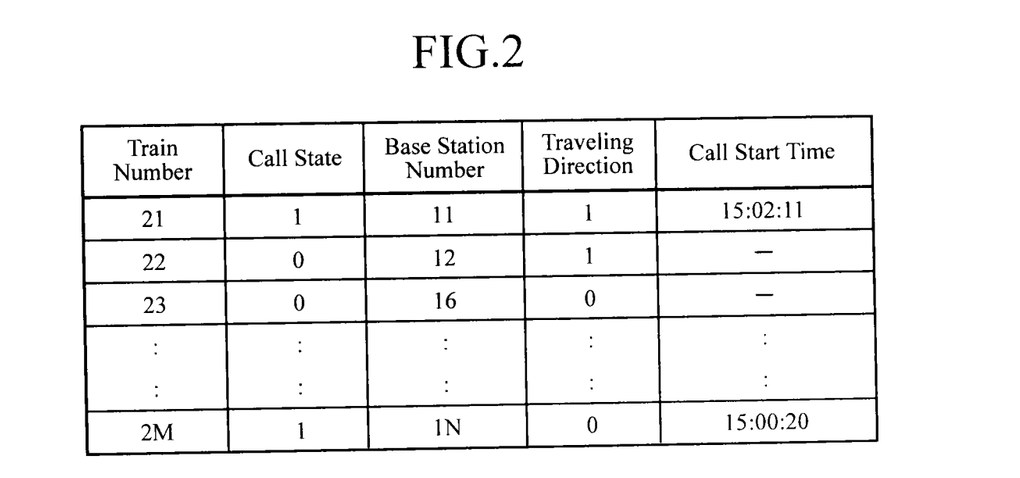
FIG. 2 is an example of contents held by a train information holder of a communication control device.

FIG. 2 is an example of the contents held by the train information holder 51 of the communication control device 5.

In FIG. 2, each call state shows that a call is being made at the time of 1, and shows that a call is not being made at the time of 0. Each base station number shows a number specifying its own base station, like the base stations 11 to 1N shown in, for example, FIG. 1. Each traveling direction shows the direction of one of the base station zones 31 to 3N shown in, for example, FIG. 1, i.e., shows 1 when the train is moving in a direction from left to right in FIG. 1 and shows 0 when the train is moving in an opposite direction.

When the call admission determinator 52 determines that a call can be made in response to a call start request (the operation of the call admission determinator 52 will be described below), the train information holder 51 of the communication control device 5 sets the call state of the train corresponding to the call to 1, and returns the call state to 0 when the call is ended. The train information holder further stores the time when it sets the call state to 1 as a call start time. Further, in order that the train information holder 51 acquires the information about the base station number and the traveling direction, when having moved from a base station zone to a new base station zone, each train transmits the information showing under which base station the zone to which the train has moved serves to the communication control device 5. The train information holder 51 updates the base station number as shown in FIG. 2 in response to this information. Further, because the train information holder can know the traveling direction of the train from the base station number before the update, the train information holder also performs an update of the traveling direction simultaneously.

Next, the operation of the call admission determinator 52 of the communication control device 5 will be explained.

The call admission determinator 52 refers to the information held by the train information holder 51, and, first, performs a search operation of determining to which base station zone the train which has made a call request belongs. Hereafter, a case in which the train 22 makes a call request will be explained as an example. The train 22 is moving from left to right in FIG. 1, as shown in FIG. 2, and it is assumed in the subsequent explanation that the train 22 is similarly moving from left to right in FIG. 1.

According to FIG. 2, the train 22 belongs to the base station zone 32 which is managed by the base station 12. Therefore, the call admission determinator 52 calculates, for each traveling direction, the number of calls of trains which belong any one of the base station zone 32 and the base station zones 31 and 33 adjacent to this base station zone 32, and which are currently during calls. Then, the call admission determinator calculates the sum of the number of calls of trains which belong to the base station zone 32 and which are during calls, and the number of calls of trains which are moving from the base station zone 31 or 33 to the base station zone 32 and which are during calls, and, when the sum is equal to or smaller than a threshold TH (criterion 1), determines that the call can be admitted, and, when the sum is larger than TH, determines that the call cannot be admitted.

Figure 3:
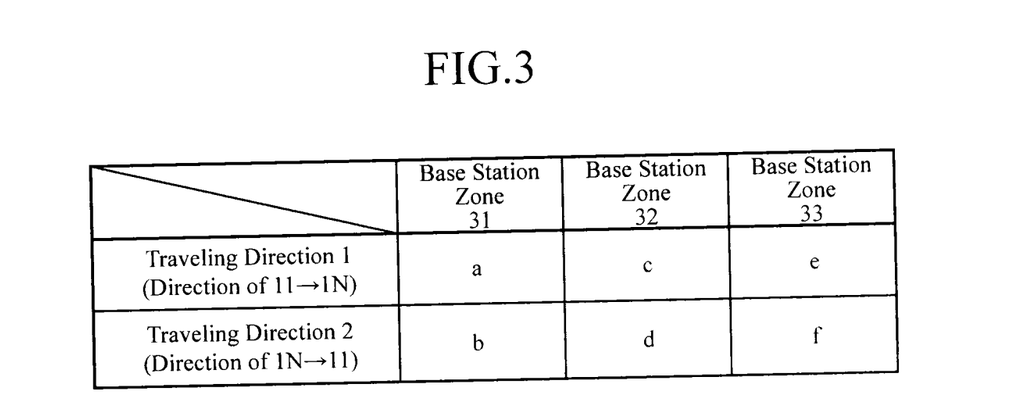
FIG. 3 is a table showing an example of a result of calculating, for each traveling direction, the number of calls of trains which are currently during calls.

FIG. 3 is a table showing an example of a result of calculating, for each traveling direction, the number of calls of trains which are currently during calls.

For example, when the result of calculating, for each traveling direction, the number of calls of trains which belong to any one of the base station zones 31, 32, and 33 and which are currently during calls is as shown in FIG. 3, if $a+c+d+f \leq TH$, the call admission determinator 52 determines that the call can be admitted; otherwise, determines that the call cannot be admitted.

To the threshold TH, a value which, when the number of calls of trains during calls in one base station zone is equal to or smaller than TH+1, prevents any problem from occurring in the speech quality of each call is set. For example, the number of calls in which the transmission rate of IP packets used by a voice call is equivalent to 70% of the transmission rate of a wireless channel is set to the threshold.

In a case in which such call admission determination is performed, when the number of calls of trains during calls in the base station zone 32 to which the train 22 which has transmitted the call start request belongs is c+d, and a call start request from the train 22 is accepted, the number of calls of trains during calls in the base station zone 32 becomes c+d+1. Because c+d+1 is equal to or smaller than TH+1, no problem occurs in the speech quality in the trains during calls in the base station zone 32. In addition, there is a possibility that trains during calls in any one of the base station zones 31 and 33 adjacent to the base station zone 32 move to the base station zone 32, and, when all of these trains move to the base station zone 32, the number of calls of trains during calls in the base station zone 32 becomes a+c+d+f+1. Also in this case, because a+c+d+f+1 is equal to or smaller than TH+1, no problem occurs in the speech quality in the trains during calls in the base station zone 32.

However, when the train 22 moves from the base station zone 32 to the base station zone 33 after the call from the train 22 is admitted through the determination according to the above-mentioned criterion 1, the number of calls of trains during calls in the base station zone 33 may exceed TH+1, and the speech quality of calls currently being made in the base station zone may degrade.

Then, in order to prevent this problem, the call disconnection determinator 53 of the communication control device 5 determines a call which should be disconnected from the calls currently being made in such a way that the number of calls currently being made in one base station zone does not exceed TH+1.

The operation of the call disconnection determinator 53 of the communication control device 5 will be explained.

The call disconnection determinator 53 refers to the information held by the train information holder 51 to calculate the number of calls currently being made in each base station zone. Then, when there is a base station zone in which the number of calls currently being made exceeds TH+1, the call disconnection determinator searches for a train having the oldest call start time from the trains during calls in the base station zone, and determines this train as a target for disconnection.

The communication control device 5 transmits a BYE request which is a type of SIP message and which means a request to end the call to the train and the VoIP terminal which are performing the call which is determined to be the target for disconnection by the call disconnection determinator 53, and the train and the VoIP terminal which have received this request stop the transmission of voice packets and also transmit a 200 O.K. response which is a response message to this BYE request and end this call.

As mentioned above, in accordance with this Embodiment 1, because at the time of communications (call), when the sum of the number of calls of moving objects in communication (voice call) in a first wireless zone (base station zone) to which a moving object (train) which is going to start the communications belongs, and the number of calls of moving objects which are in communication in a second wireless zone adjacent to the first wireless zone, and which are moving from the second wireless zone adjacent to the first wireless zone to the first wireless zone is equal to or smaller than the threshold TH (first threshold), the call admission determinator 52 of the communication control device 5 determines that the communications can be started, high-quality communications, such as a high-quality voice call, can be implemented in the VoIP-ized mobile wireless communication system. Further, because even if the calls currently being made in a base station zone increases, the communication control device 5 disconnects a call having the longest call duration in the base station zone before the communication quality degrades, high-quality communications, such as a high-quality voice call, in one base station zone can be ensured in the VoIP-ized mobile wireless communication system.

Embodiment 2.

Although the case of performing call admission determination in such a way that the speech quality does not degrade in a base station zone to which a train which makes a request to start a call belongs is explained in Embodiment 1, an embodiment in a case of, even if a train moves to an adjacent base station zone from the base station zone to which the train currently belongs after starting a call, performing call admission determination in such a way that the speech quality does not degrade in the base station zone to which the train has moved will be shown next.

The configuration of a train wireless voice communication system in accordance with this Embodiment 2 is the same as that of FIG. 1 shown in Embodiment 1, and only the operation of the call admission determinator 52 of the communication control device 5 shown in FIG. 1 differs.

Hereafter, the operation of the call admission determinator 52 in accordance with Embodiment 2 will be explained by taking, as an example, a case in which the train 22 makes a call to the VoIP terminal 61.

The call admission determinator 52 performs a search operation of determining to which base station zone the train 22 belongs first by referring to the information in the train information holder 51.

For example, assuming that the information in the train information holder 51 has contents shown in FIG. 2, the train 22 belongs to the base station zone 32 which is managed by the base station 12. Therefore, the call admission determinator 52 calculates, for each traveling direction, the number of calls of trains which belong any one of this base station zone 32, the base station zones 31 and 33 adjacent to this base station zone 32, and the base station zone 34 which is located in the traveling direction of the train 22 and is the second one forward from the base station zone to which the train currently belongs, and which are currently during calls.

The call admission determinator 52 then determines that the call can be admitted when two types of criteria (criteria 1 and 2) shown below are satisfied simultaneously, and, when the criteria are not satisfied, determines that the call cannot be admitted. The criterion 1 is the same as the criterion (criterion 1) according to which the call admission determinator 52 shown in Embodiment 1 determines whether the call can be admitted.

(Criterion 1)

This criterion is the one in which the sum of the number of calls of trains which belong the base station zone 32 and which are during calls, and the number of calls of trains which are moving from the base station zone 31 or 33 to the base station zone 32 and which are during calls is calculated, and the sum is equal to or smaller than the threshold TH.

(Criterion 2)

This criterion is the one in which the sum of the number of calls of trains which belong the base station zone 33 and which are during calls, and the number of calls of trains which are moving from the base station zone 32 or 34 to the base station zone 33 and which are during calls is calculated, and the sum is equal to or smaller than the threshold TH.

Figure 4:
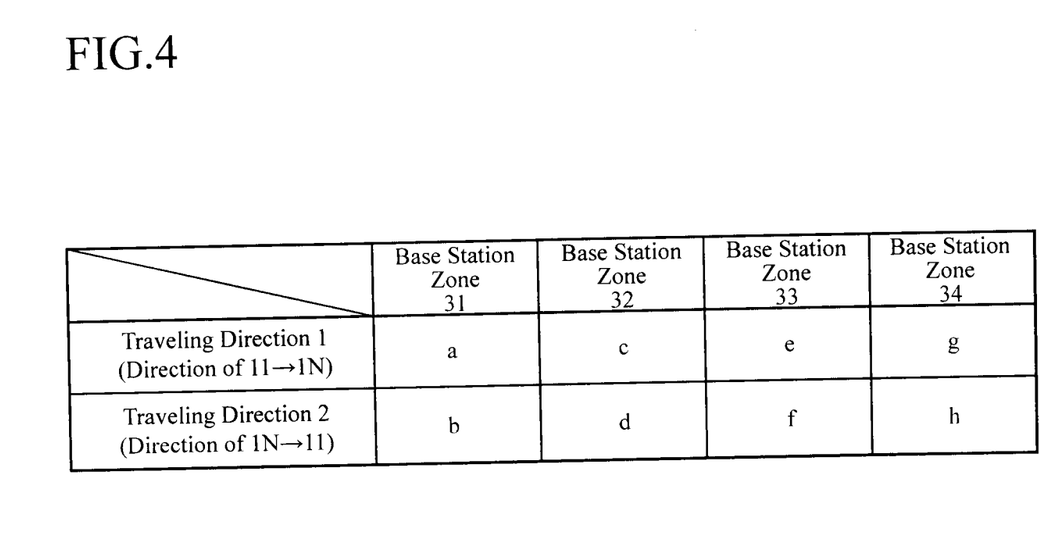
FIG. 4 is a table showing an example of a result of calculating, for each traveling direction and for each base station zone, the number of calls of trains which are currently during calls.

FIG. 4 is a table showing an example of a result of calculating the number of calls of trains which are currently during calls for each traveling direction and for each base station zone.

For example, when the result of calculating, for each traveling direction, the number of calls of trains which belong to any one of the base station zones 31, 32, 33, and 34 and which are currently during calls is as shown in FIG. 4, if a+c+d+f≤TH (criterion 1) and c+e+f+h≤TH (criterion 2), the call admission determinator 52 determines that the call can be admitted; otherwise, determines that the call cannot be admitted.

According to this criterion 1, the degradation of the speech quality in a train during a call in the base station zone 32 is prevented. Then, according to the criterion 2, the sum of the number of trains during calls in the base station zone 33, and the number of trains which reaches when trains which have been during calls in the base station zone 32 or 34 adjacent to this base station zone 33 and which have been moving to the base station zone 33 have all moved to the base station zone 33 becomes equal to or smaller than TH. Therefore, even if the train 22 has moved to the base station zone 33, degradation of the speech quality does not occur in a train during a call in the base station zone 33.

When the train 22 further moves and belongs to the base station zone 34, there is a possibility that the speech quality of a call being made degrades in the base station zone 34. As to this problem, the call disconnection determinator 53 determines a call which should be disconnected from among the calls being made in the base station zone, and ends the call in the same way as the operation explained in above-mentioned Embodiment 1.

As mentioned above, because the call admission determinator 52 of the communication control device 5 in accordance with this Embodiment 2 is configured in such a way as to, at the time of communications, when the sum of the number of calls of moving objects in communication (voice communication) in a first wireless zone (base station zone) to which a moving object (train) which is going to start the communications (call) belongs, and the number of calls of moving object which are moving from a second wireless zone adjacent to the first wireless zone to the first wireless zone and which are in communication is equal to or smaller than the threshold TH (first threshold), and the sum of the number of calls of moving objects which are located in the traveling direction of the moving object which is going to start the communications, and which are in communication in the second wireless zone adjacent to the first wireless zone to which the moving object currently belongs, and the number of calls of moving objects which are moving from a wireless zone adjacent to the second wireless zone to the second wireless zone, and which are in communication is equal to or smaller than the threshold TH (first threshold), determine that the communications can be started, in the VoIP-ized mobile wireless communication system, even if a moving object moves from the base station zone to which the moving object currently belongs to an adjacent base station zone, the call admission determination can be performed in such a way that the communication quality does not degrade in the base station zone to which the moving object has moved, and high-quality communications, such as a high-quality voice call, can be implemented.

Further, because even if the calls being made in a base station zone increases, the communication control device 5 disconnects a call having the longest communication duration in the base station zone before the communication quality degrades, high-quality communications, such as a high-quality voice call, in one base station zone can be ensured in the VoIP-ized mobile wireless communication system.

Embodiment 3.

Although the example in which good speech quality can be maintained even after a train which starts a call moves from the base station zone to which the train belongs at the time of starting the call to an adjacent base station zone is explained in Embodiment 2, the criteria for call admission are rigorous as compared with that shown in Embodiment 1.

Therefore, in this Embodiment 3, an embodiment of, although operations become complicated, facilitating the admission of a call by changing the criteria according to which to determine whether or not to admit a call according the time required for a train which starts a call to move from the base station zone to which the train currently belongs to an adjacent zone will be shown.

The configuration of a train wireless voice communication system in accordance with this Embodiment 3 is the same as that of FIG. 1 explained in Embodiments 1 and 2, and only the operations of the train information holder 51 and the call admission determinator 52 of the communication control device 5 shown in FIG. 1 differ.

Hereafter, the operations of the train information holder 51 and the call admission determinator 52 in accordance with Embodiment 3 will be explained by taking, as an example, a case in which the train 22 makes a call to the VoIP terminal 61.

First, the operation of the train information holder 51 of the communication control device 5 will be explained.

The train information holder 51 holds, for each of the trains 21 to 2M in the train wireless voice communication system, a call state showing whether or not each of the trains 21 to 2M is during a call, a base station number specifying one of the base stations 11 to 1N corresponding to one of the base station zones 31 to 3N to which each of the trains 21 to 2M belongs, the traveling direction of each of the trains, a start time of a call at the time when each of the trains 21 to 2M is during the call, and the time when each of the trains 21 to 2M entered the one of the base station zones 31 to 3N to which each of the trains 21 to 2M currently belongs.

Figure 5:
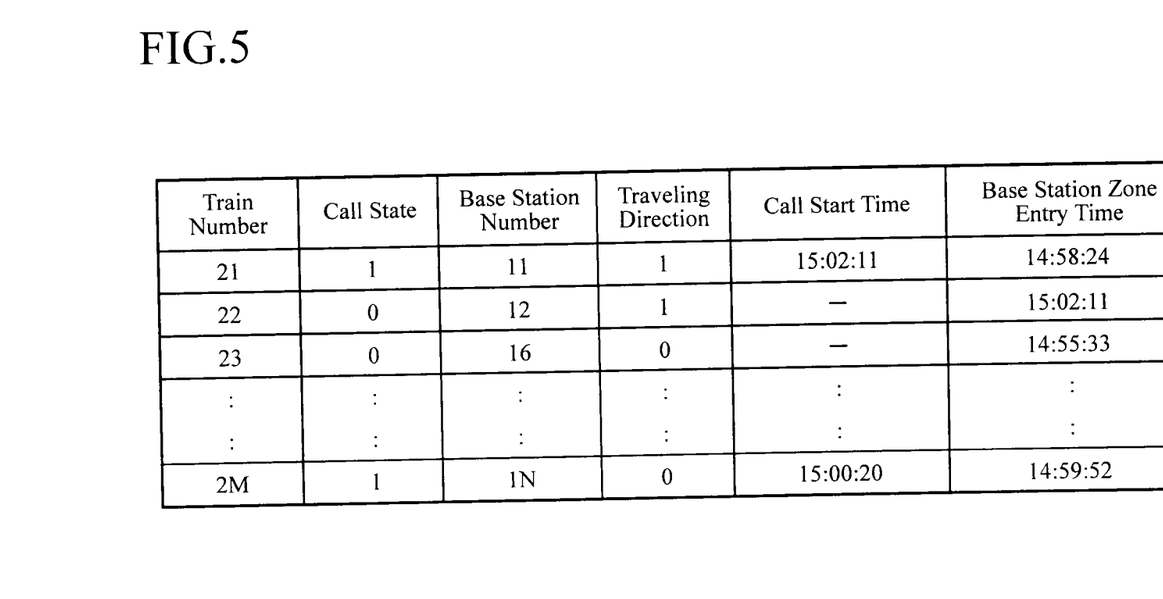
FIG. 5 is a table showing an example of contents held by a train information holder of a communication control device in accordance with Embodiment 3 of the present invention.

FIG. 5 is a table showing an example of the contents held by the train information holder 51 of the communication control device 5 in accordance with Embodiment 3 of the present invent ion. In FIG. 5, the information other than the base station zone entry time is the same as that of FIG. 2 shown in Embodiment 1, and a method of acquiring each information is also the same as that shown in Embodiment 1.

The base station zone entry time is acquired at the same time when the information about the base station number and the traveling direction is acquired. Concretely, when having moved to a new base station zone, each train transmits information showing under which base station the zone to which the train has moved serves to the communication control device 5. While the train information holder 51 updates the base station number and the traveling direction of the train in response to this information, the train information holder 51 holds this time when it has updated them as the base station zone entry time of that train.

Next, the operation of the call admission determinator 52 of the communication control device 5 will be explained when receiving a call start request from the train 22.

The call admission determinator 52 performs a search operation of determining to which base station zone the train 22 belongs first by referring to the information in the train information holder 51. The call admission determinator then calculates, for each traveling direction, how many trains belong any one of the base station zone 32 to which the train 22 currently belongs, the base station zones 31 and 33 adjacent to this base station zone 32, and the base station zone 34 which is located in the traveling direction of the train 22 and is the second one forward from the base station zone to which the train currently belongs, and are currently during calls. A concrete calculating operation is the same as that of Embodiment 2, and a calculation result is as shown in, for example, FIG. 4, like in the case of Embodiment 2.

The call admission determinator further calculates the difference between the current time and the entry time when the train 22 entered the current base station zone (base station zone 32), i.e., the time which has elapsed after the train 22 has entered the current base station zone (base station zone 32). The call admission determinator 52 then performs call admission determination according to a criterion different dependently upon whether the time which has elapsed after the train 22 has entered the current base station zone (base station zone 32) is equal to or less than a time threshold THT or greater than the time threshold THT.

When the time which has elapsed after the train 22 has entered the current base station zone (base station zone 32) is equal to or less than the time threshold THT, i.e., when the period of time during which the train 22 is expected to belong to the current base station zone (base station zone 32) even from this time forward is greater than the time threshold THT, if the criterion (criterion 1) shown in Embodiment 1 is satisfied, the call admission determinator admits the call; otherwise, the call admission determinator does not admit the call. More specifically, in the example of FIG. 4, if a+c+d+f≤TH, the call admission determinator determines that the call can be admitted; otherwise, determines that the call cannot be admitted.

In contrast, when the time which has elapsed after the train 22 has entered the current base station zone (base station zone 32) is greater than the time threshold THT, i.e., when the period of time during which the train 22 is expected to belong to the base station zone (base station zone 32) even from this time forward is equal to or less than the time threshold THT, if the criteria (criteria 1 and 2) shown in Embodiment 2 are satisfied, the call admission determinator admits the call; otherwise, the call admission determinator does not admit the call. More specifically, in the example of FIG. 4, if a+c+d+f≤TH and c+e+f+h≤TH, the call admission determinator determines that the call can be admitted; otherwise, determines that the call cannot be admitted.

The period of time during which a train belongs to one base station zone is preset according to a timetable. When the minimum of the period of time is expressed by TMIN, if the time which has elapsed after the train 22 has entered the base station zone 32 is equal to or less than THT, it is said that the train 22 will belong to the base station zone 32 from this time forward for a period of time equal to or greater than TMIN-THT. More specifically, when the duration of the call is equal to or less than TMIN-THT, the train 22 ends the call before having moved to an adjacent base station. In contrast, when the time which has elapsed after the train 22 has entered the base station zone 32 exceeds THT, because there is a possibility that the train 22 moves to an adjacent base station during the call even if the duration of the call is equal to or less than TMIN-THT, the criteria for call admission are made to be rigorous in that case. More specifically, the call admission determinator 52 performs call admission determination on a call having a call duration equal to or less than TMIN-THT also in an adjacent base station in such a way that the speech quality does not degrade.

When the train 22 further moves and belongs to the base station zone 34, there is a possibility that the speech quality of a call being made in the base station zone 34 degrades. As to this problem, the call disconnection determinator 53 determines a call which should be disconnected from among the calls being made in the base station zone, and ends the call in the same way as the operations explained in above-mentioned Embodiments 1 and 2.

As mentioned above, because the call admission determinator 52 of the communication control device 5 in accordance with this Embodiment 3 is configured in such a way as to, at the time of communications (call), when the period of time during which a moving object (train) which is going to start the communications is expected to belong to a first wireless zone (base station zone), to which the moving object belongs, from this time forward is greater than the threshold THT (second threshold), determine that the communications can be started if the sum of the number of calls of moving objects in communication (voice communication) in the first wireless zone and the number of calls of moving objects which are moving from a second wireless zone adjacent to the first wireless zone to the first wireless zone and which are in communication is equal to or smaller than the threshold TH (first threshold), and, when the period of time during which the moving object which is going to start the communications is expected to belong to the first wireless zone, to which the moving object belongs, from this time forward is equal to or less than the threshold THT (second threshold), determine that the communications can be started if the sum of the number of calls of moving objects in communication in the first wireless zone and the number of calls of moving objects which are moving from the second wireless zone adjacent to the first wireless zone to the first wireless zone and which are in communication is equal to or smaller than the threshold TH (first threshold), and the sum of the number of calls of moving objects which are located in the traveling direction of the moving object which is going to start the communications, and which are in communication in the second wireless zone adjacent to the first wireless zone to which the moving object currently belongs, and the number of calls of moving objects which are moving from a third wireless zone adjacent to the second wireless zone to the second wireless zone, and which are in communication is equal to or smaller than the threshold TH (first threshold), the call admission determinator can perform the call admission determination according to the criteria which facilitate the admission of a call, and can implement high-quality communications, such as a high-quality voice call, in the VoIP-ized mobile wireless communication system by, even when the moving object moves from the base zone to which the moving object currently belongs to an adjacent base zone, preventing the communication quality from degrading in the base station zone to which the moving object has moved.

Further, because even if the calls being made in a base station zone increases, the communication control device 5 disconnects a call having the longest communication duration in the base station zone before the speech quality degrades, high-quality communications, such as a high-quality voice call, in one base station zone can be ensured in the VoIP-ized mobile wireless communication system.
Embodiment 4.

In this Embodiment 4, in addition to Embodiment 3, an embodiment of, although operations become complicated, facilitating the admission of a call by changing criteria according to which to determine whether or not to admit a call according to the time required for a train which starts the call to move from the base station zone to which the train currently belongs to an adjacent zone will be shown.

The configuration of a train wireless voice communication system in accordance with this Embodiment 4 is the same as that of FIG. 1 explained in Embodiments 1 to 3, and this embodiment differs from Embodiment 2 in the operation of the call admission determinator 52 of the communication control device 5 shown in FIG. 1. Further, the train information holder 51 differs from that in accordance with Embodiment 2 in that the train information holder holds a base station zone entry time, like that in accordance with Embodiment 3 (FIG. 5).

Hereafter, a case in which the train 22 makes a call to the VoIP terminal 61 will be explained, as an example, as to the operation of the call admission determinator 52 in Embodiment 4.

First, the call admission determinator 52 performs the same operation as that shown in Embodiment 2 to perform a search operation of determining to which base station zone the train 22 belongs by referring to the information in the train information holder 51. At that time, assuming that the information held by the train information holder 51 is as shown in FIG. 5, it can be seen that the train 22 currently belongs to the base station zone 32 (base station number of 12).

The call admission determinator 52 then calculates an expected value t22 of the time required for the train 22 to move from the base station zone 32 to which the train currently belongs to the base station zone 33. Because the period of time during which a train belongs to one base station zone is predetermined according to a timetable, and the average period of time during which the train belongs to the base station zone 32 is known in advance. When this average period of time is expressed by TM, t22 is given as follows.

$$t22=TM-\text{(the current time-the time when the train 22 entered the base station zone 32)}$$

Next, the call admission determinator 52 searches for all trains which belong any one of the base station zone 32 to which the train 22 currently belongs, the base station zones 31 and 33 adjacent to this base station zone 32, and the base station zone 34 which is located in the traveling direction of the train 22 and is the second one forward from the base station zone 32, and which are currently during calls. The call admission determinator then calculates how many trains are during calls for each traveling direction (refer to FIG. 4).

In addition, fort each of the trains which are found through this search, the call admission determinator 52 calculates an expected value of the time required to move from the current base station zone to an adjacent base station zone. A method of calculating this expected value is the same as the above-mentioned method of determining t22. When this expected value is expressed by t, the number of calls of trains which satisfy $t \leq \alpha \times t22$ and the number of calls of trains which satisfy $t \geq \beta \times t22$ are calculated for each base station zone and for each traveling direction. Further, the number of calls of all trains which are during calls regardless of the expected value t of the time required to move from the current base station zone to an adjacent base station zone are also calculated for each base station zone and for each traveling direction. In this case, $\alpha$ is a numerical value equal to or smaller than 1 while $\beta$ is a numerical value equal to or larger than 1.

Figure 6:
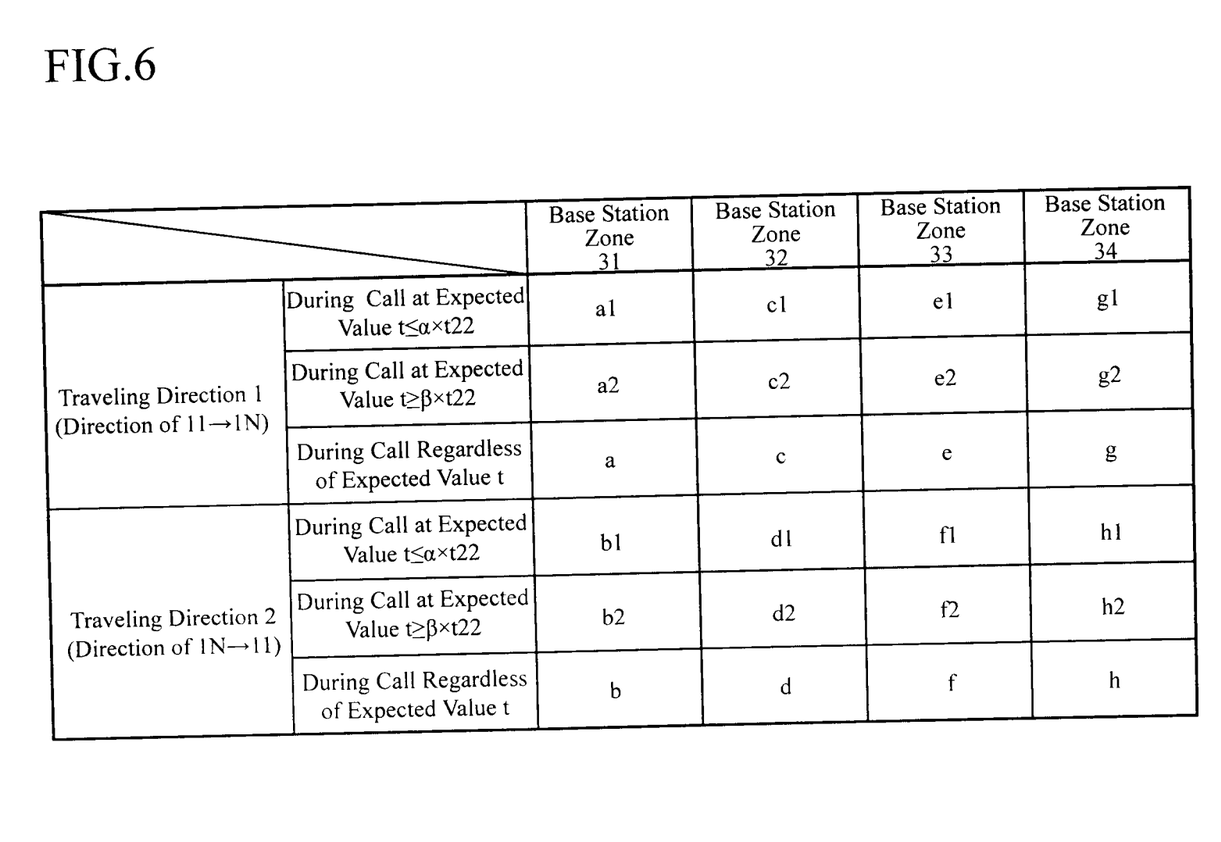
FIG. 6 is a table showing an example of a result of determining, for each of criteria based on a traveling direction and an expected value, trains in each base station zone.

FIG. 6 is a table showing an example of a result of determining, in each base station zone, trains for each of the criteria based on the traveling direction and the expected value.

On the basis the calculation result shown in FIG. 6, when the two types of criteria (criteria 3 and 4) shown hereafter are satisfied simultaneously, it is determined that the call can be admitted; otherwise, it is determined that the call cannot be admitted.
(Criterion 3)

The sum of the number of calls of trains (according to FIG. 6, c+d) during calls in the base station zone 32 to which the train 22 currently belongs, and the number of calls of trains (according to FIG. 6, a1+f1) which belong to the base station zone 31 or 33 adjacent to the base station zone 32, and are moving toward the base station zone 32 and are during calls, and which are expected to move to the base station zone 32 within $\alpha \times t22$, i.e., before the train 22 has moved from the base station zone 32 to the base station zone 33 and are during calls is equal to or smaller than a threshold TH.
(Criterion 4)

The sum of the number of calls of trains (according to FIG. 6, e2+f2) which are located in the traveling direction of the train 22 and are during calls in the base station zone 33 adjacent to the base station zone 32 to which the train 22 currently belongs, and which are expected to belong to the base station zone 33 after $\beta \times t22$, i.e., even after the train 22 has reached the base station zone 33, and the number of calls of trains (according to FIG. 6, c+h) which belong to the base station zone 32 or 34 adjacent to the base station zone 33 and are moving toward the base station zone 33 and which are during calls is equal to or smaller than the threshold TH.

More specifically, the criterion 3 is concretely $c+d+a1+f1 \leq TH$. Further, the criterion 4 is $e2+f2+c+h \leq TH$.

Because $\alpha$ and $\beta$ in the above-mentioned criteria are factors of safety, a numerical value equal to or smaller than 1 is set to $\alpha$ while a numerical value equal to or larger than 1 is set to $\beta$. For example, $\alpha=1/1.5$ and $\beta=1$.

In this case, a difference between the criteria of the call admission determinator 52 in this Embodiment 4, and the criteria of the call admission determinator 52 explained in Embodiment 2 will be explained.

As to the first criterion (the criterion 1 in Embodiment 2, the criterion 3 in this Embodiment 4), while in the case of the criterion 1, the number of calls of all trains which are moving toward the base station zone 32 to which the train 22 belongs and are during calls is used for the determination, in the case of the criterion 3, trains, even though they are moving toward the base station zone 32 and are during calls, which are expected to enter the base station zone after the train 22 has moved from the base station zone 32 to the base station zone 33 are not used for the determination.

Further, as to the second criterion (the criterion 2 in Embodiment 2, the criterion 4 in this Embodiment 4), while in the case of the criterion 2, the number of calls of all trains which are during calls in the base station zone 33 toward which the train 22 is moving is used for the determination, in the case of the criterion 4, trains, even though they are during calls in the base station zone 33, which are expected to have moved from the base station zone 33 to another zone after the train 22 has moved from the base station zone 32 to the base station zone 33 are not used for the determination.

When the criteria are described by using the contents of FIG. 6, in the case of Embodiment 2, the call is admitted when $a+c+d+f \leq TH$ and $c+e+f+h \leq TH$ while in this Embodiment 4, the call is admitted when $a1+c+d+f1 \leq TH$ and $c+e2+f2+h \leq TH$. It is clear that $a1+c1 \leq a+c$ and $e2+f2 \leq e+f$, and it clearly becomes easy to determine that the call can be admitted, as compared with Embodiment 2.

When the train 22 further moves and belongs to the base station zone 34, there is a possibility that the speech quality of a call being made in the base station zone 34 degrades. As to this problem, the call disconnection determinator 53 determines a call which should be disconnected from among the calls being made in the base station zone, and ends the call in the same way as the operations explained in above-mentioned Embodiments 1 and 2.

As mentioned above, because the call admission determinator of the communication control device in accordance with this Embodiment 4 is configured in such a way as to, at the time of communications (call), when the sum of the number of calls of moving objects in communication (voice communication) in a first wireless zone to which a moving object (train) which is going to start the communications belongs and the number of calls of moving objects in communication which are moving from a second wireless zone adjacent to the first wireless zone to the first wireless zone, and which are expected to reach the first wireless zone before the moving object which is going to start the communications has moved from the first wireless zone to another wireless zone is equal to or smaller than the threshold TH (first threshold), and the sum of the number of calls of moving objects in communication which are located in the traveling direction of the moving object which is going to start the communications and belong to the second wireless zone adjacent to the wireless zone to which the moving object currently belongs, and which are expected to belong to the second wireless zone even after the moving object which is going to start the communications has reached the second wireless zone, and the number of calls of moving object which are moving from a third wireless zone adjacent to the second wireless zone to the second wireless zone is equal to or smaller than the threshold TH (first threshold), determine that the communications can be started, the call admission determinator can perform the call admission determination according to the criteria which facilitate the admission of a call, and can implement high-quality communications, such as a high-quality voice call, in the VoIP-ized mobile wireless communication system by, even when the moving object has moved from the base zone to which the moving object currently belongs to an adjacent base zone, preventing the speech quality from degrading in the base station zone to which the moving object has moved.

Further, because even if the calls being made in a base station zone increases, the communication control device 5 disconnects a call having the longest communication duration in the base station zone before the communication quality degrades, high-quality communications, such as a high-quality voice call, in one base station zone can be ensured in the VoIP-ized mobile wireless communication system.

The call admission determinator 52 can determine that the call can be admitted at all times when the criterion 3 shown in Embodiment 4 is satisfied. In this case, although no problem occurs in the speech quality during a period of time during which the train 22 moves to an adjacent zone, like in the case of Embodiment 1, the call admission determinator can facilitate the admission of a call, as compared with Embodiment 1.

Further, although in Embodiments 2 to 4, the admission of a call is determined in such a way that the speech quality does not degrade even after a train which is going to start a call has moved from the base station zone to which the train currently belongs to an adjacent base station zone, the admission of a call can be determined by using the same method in such a way that the speech quality does not degrade even after the train has moved to the second or subsequent one forward from the current base station zone, such as a further adjacent zone.

Further, although the threshold TH used for the determination of call admission is a fixed value in Embodiments 1 to 4, the threshold can be a variable value. For example, when data communications are simultaneously performed in a base station zone in which a call is made, the threshold TH can be varied according to the load of the data communications.

Further, even if the threshold is a fixed value, the threshold can be varied according to the base station zones. For example, there can be considered a case in which the transmission capacity of wireless varies according to the base station zones when the wireless wave conditions of wireless differ according to the base station zones, and a high threshold is set to a base station zone whose transmission capacity is high while a low threshold is set to a base station zone whose transmission capacity is low. In such a case, different values are used, respectively, as the thresholds TH for the first and second criteria among the criteria for call admission shown in above-mentioned Embodiments 2, 3, and 4.

Further, although in Embodiment 3, the criteria according to which to determine whether or not to admit the call are changed by using the time which has elapsed after the train 22 has entered the current base station zone, the time which has elapsed after the train has entered a base station zone preceding, by one base station zone, the current base station zone before that time can be alternatively used.

Further, because the period of time during which each train will belong to the current base station zone from this time forward is predetermined according to a timetable, the criteria according to which to determine whether or not to admit the call can be changed on the basis of the timetable and the current time.

In addition, the period of time during which each train will belong to the current base station zone from this time forward can be estimated and the criteria according to which to determine whether or not to admit the call can be changed on the basis of the position information about the train. For example, each train determines its position by using GPS (Global Positioning System) and the train information holder 51 receives the position information from each train at regular intervals and holds the position information, so that the call admission determinator 52 can know the position information about each train at all times. When the current position about each train is determined, the time required for the train to reach the next base station zone can be estimated.

Figure 7:
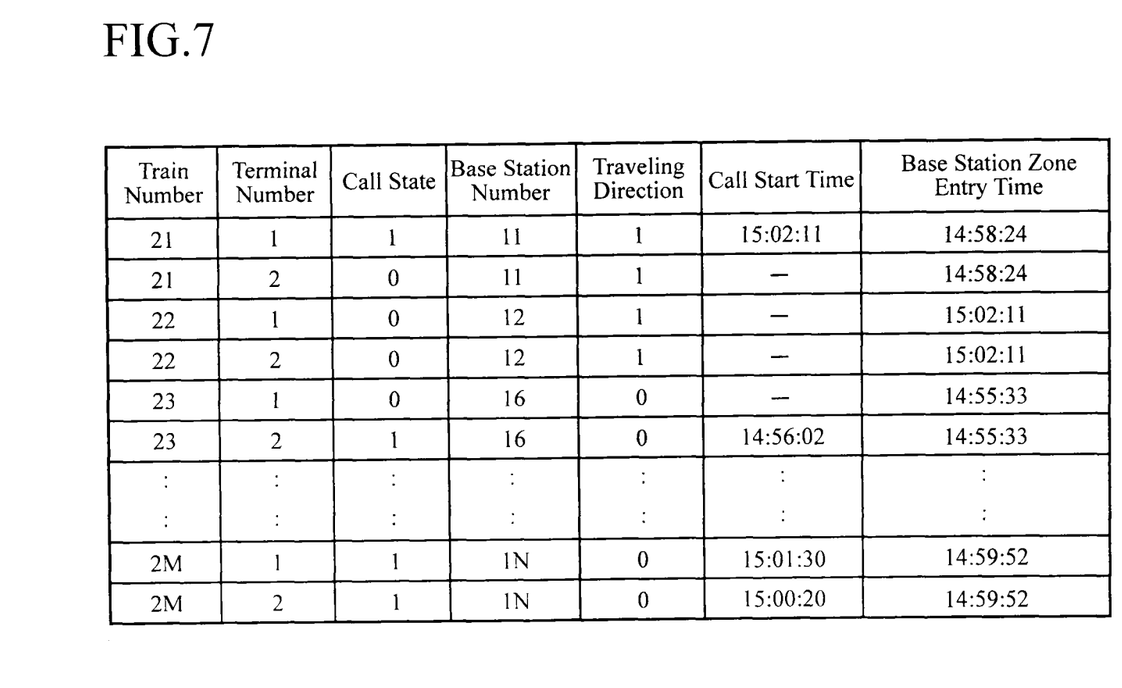
FIG. 7 is an example of contents held by a train information holder of a communication control device of a terminal in a case in which in a train, there are two terminals which can communicate with a VoIP terminal on the ground.

Further, although the example in which the number of calls between each train and the ground is 1 is explained in Embodiments 1 to 4, each train can make calls to a plurality of VoIP terminals. For example, it is assumed that, in each train, there are two terminals each of which can communicate with one of the VoIP terminals 61 to 6L on the ground. The train information holder 51 of the communication control device 5 holds information for each of the terminals disposed in each train, as shown in FIG. 7, so that the admission determinator 52 can perform the same operation as that explained in Embodiment 4.

Although in Embodiments 1 to 4, the operation of performing voice communications between each train and the ground is explained, the present invention can be applied to communications of a medium such as a video.

Further, the present invention is not limited to train wireless communications, and can be applied to communications between a moving object for which its moving route is predetermined, such as a bus on a regular route, a ropeway, or a cable car, which is disposed as a moving object equipped with a wireless device, and the ground.

While the invention has been described in its preferred embodiments, it is to be understood that an arbitrary combination of two or more of the above-mentioned embodiments can be made, various changes can be made in an arbitrary component in accordance with any one of the above-mentioned embodiments, and an arbitrary component in accordance with any one of the above-mentioned embodiments can be omitted within the scope of the invention.

INDUSTRIAL APPLICABILITY

Because the mobile wireless communication control device in accordance with the present invention can implement high-quality communications, such as a high-quality voice call, in the VoIP-ized mobile wireless communication system, the mobile wireless communication control device can be applied as a mobile wireless communication control device that controls communications, such as the voice communications, in the mobile wireless communication system, and so on.

EXPLANATIONS OF REFERENCE NUMERALS

4 IP network, 5 communication control device, 11 to 1N base station, 21 to 2M train, 31 to 3N base station zone, 51 train information holder, 52 call admission determinator, 53 call disconnection determinator, and 61 to 6L VoIP terminal.

The invention claimed is:

1. A mobile wireless communication control device that, in a mobile wireless communication system in which a moving object which moves in a plurality of wireless zones performs communications with a ground side via a base station, performs start control of said communications, said mobile wireless communication control device comprising:
a moving object information memory to store a communication state of said moving object and information showing a wireless zone to which the moving object belongs; and
a controller configured to perform as a call admission determinator to refer to the information stored by said moving object information memory, and determine whether a moving object which is going to start said communications can start the communications on a basis of a number of calls of moving objects in communication in a first wireless zone to which said moving object which is going to start the communications belongs, and a number of calls of moving objects in communication in a second wireless zone adjacent to the first wireless zone.

2. The mobile wireless communication control device according to claim 1, wherein said second wireless zone is adjacent in a traveling direction of the moving object which is going to start said communications.

3. The mobile wireless communication control device according to claim 1, wherein said second wireless zone is adjacent in a direction opposite to a traveling direction of the moving object which is going to start said communications.

4. The mobile wireless communication control device according to claim 1, wherein said call admission determinator determines whether the moving object which is going to start said communications can start the communications on a basis of a number of calls of moving objects which belong to said second wireless zone and are moving in a direction toward said first wireless zone.

5. The mobile wireless communication control device according to claim 1, wherein said moving object information memory stores a moving object number specifying said moving object, a communication state showing whether or not said moving object is in communication, a number specifying said base station corresponding to said wireless zone to which said moving object currently belongs, and a traveling direction of said moving object, and, at a time of starting communications, when a sum of the number of calls of the moving objects in communication in the first wireless zone to which the moving object which is going to start said communications belongs, and a number of calls of moving objects which are moving from the second wireless zone adjacent to said first wireless zone to said first wireless zone and which are in communication is equal to or smaller than a first threshold, said call admission determinator determines that the communications can be started.

6. The mobile wireless communication control device according to claim 5, wherein at a time of starting communications, when the sum of the number of calls of the moving objects in communication in said first wireless zone to which the moving object which is going to start said communications belongs, and the number of calls of the moving objects which are moving from the second wireless zone adjacent to said first wireless zone to said first wireless zone and which are in communication is equal to or smaller than said first threshold, and a sum of a number of calls of moving objects which are located in the traveling direction of the moving object which is going to start said communications, and which are in communication in the second wireless zone adjacent to said first wireless zone to which the moving object currently belongs, and a number of calls of moving objects which are moving from a third wireless zone adjacent to said second wireless zone to said second wireless zone, and which are in communication is equal to or smaller than said first threshold, said call admission determinator determines that the communications can be started.

7. The mobile wireless communication control device according to claim 5, wherein said moving object information memory further stores a time when said moving object entered said wireless zone to which said moving object currently belongs, and, at a time of starting communications, when a period of time during which the moving object which is going to start said communications is expected to belong to said first wireless zone from this time forward is greater than a second threshold, said call admission determinator determines that the communications can be started if the sum of the number of calls of the moving objects in communication in said first wireless zone and the number of calls of the moving objects which are moving from the second wireless zone adjacent to said first wireless zone to said first wireless zone and which are in communication is equal to or smaller than said first threshold, and, when the period of time during which the moving object which is going to start said communications is expected to belong to said first wireless zone from this time forward is equal to or less than said second threshold, said call admission determinator determines that the communications can be started if the sum of the number of calls of the moving objects in communication in said first wireless zone and the number of calls of the moving objects which are moving from the second wireless zone adjacent to said first wireless zone to said first wireless zone and which are in communication is equal to or smaller than said first threshold, and a sum of a number of calls of moving objects which are located in the traveling direction of the moving object which is going to start said communications, and which are in communication in the second wireless zone adjacent to said first wireless zone to which the moving object currently belongs, and a number of calls of moving objects which are moving from a third wireless zone adjacent to said second wireless zone to said second wireless zone and which are in communication is equal to or smaller than said first threshold.

8. The mobile wireless communication control device according to claim 5, wherein said moving object information memory further stores a time when said moving object entered said wireless zone to which said moving object currently belongs, and, at a time of starting communications, when a sum of the number of calls of the moving objects in communication in said first wireless zone to which the moving object which is going to start said communications belongs and a number of calls of moving objects in communication which are moving from a wireless zone adjacent to said first wireless zone to said first wireless zone, and which are expected to reach said first wireless zone before the moving object which is going to start said communications has moved from said first wireless zone to another wireless zone is equal to or smaller than said first threshold, and a sum of a number of calls of moving objects in communication which are located in the traveling direction of the moving object which is going to start said communications and belong to the second wireless zone adjacent to the wireless zone to which the moving object currently belongs, and which are expected to belong to said second wireless zone even after the moving object which is going to start said communications has reached said second wireless zone, and a number of calls of moving object which are moving from a third wireless zone adjacent to said second wireless zone to said second wireless zone is equal to or smaller than said first threshold, said call admission determinator determines that the communications can be started.

9. The mobile wireless communication control device according to claim 5, wherein said moving object information memory further stores a time when said moving object entered said wireless zone to which said moving object currently belongs, and, at a time of starting communications, when a sum of the number of calls of the moving objects in communication in said first wireless zone to which the moving object which is going to start said communications belongs and a number of calls of moving objects in communication which are moving from the second wireless zone adjacent to said first wireless zone to said first wireless zone and which are expected to reach said first wireless zone before the moving object which is going to start said communications has moved from said first wireless zone to another wireless zone is equal to or smaller than said first threshold, said call admission determinator determines that the communications can be started.

10. The mobile wireless communication control device according to claim 7, wherein said mobile wireless communication control device predicts a period of time during which said moving object is expected to belong to a wireless zone from this time forward on a basis of either a time when said moving object entered the wireless zone or a time when said moving object entered a wireless zone to which said moving object belonged before that time.

11. The mobile wireless communication control device according to claim 7, wherein said mobile wireless communication control device predicts a period of time during which said moving object is expected to belong to a wireless zone from this time forward on a basis of both a timetable of said moving object and a current time.

12. The mobile wireless communication control device according to claim 7, wherein said mobile wireless communication control device predicts a period of time during which said moving object is expected to belong to a wireless zone from this time forward on a basis of position information about said moving object.

13. A mobile wireless communication system in which a moving object moving in a plurality of wireless zones performs communications with a ground side via a base station, said mobile wireless communication system comprising:
  a mobile wireless communication control device that includes
    a moving object information memory to store a communication state of said moving object and information showing a wireless zone to which the moving object belongs; and
    a controller configured to perform as a call admission determinator to refer to the information stored by said moving object information memory, and determine whether a moving object which is going to start communications can start the communications on a basis of a number of calls of moving objects in communication in a first wireless zone to which said moving object which is going to start the communications belongs, and a number of calls of moving objects in communication in a second wireless zone adjacent to the first wireless zone.

* * * * *